US012699257B2

(12) United States Patent
Sugiyama

(10) Patent No.: US 12,699,257 B2
(45) Date of Patent: Aug. 4, 2026

(54) IMAGING LENS SYSTEM AND CAPTURING APPARATUS

(71) Applicant: Maxell, Ltd., Kyoto (JP)

(72) Inventor: Takashi Sugiyama, Kyoto (JP)

(73) Assignee: MAXELL, LTD., Kyoto (JP)

(*) Notice: Subject to any disclaimer, the term of this patent is extended or adjusted under 35 U.S.C. 154(b) by 300 days.

(21) Appl. No.: 18/029,667

(22) PCT Filed: Sep. 21, 2021

(86) PCT No.: PCT/JP2021/034477
§ 371 (c)(1),
(2) Date: Mar. 31, 2023

(87) PCT Pub. No.: WO2022/071011
PCT Pub. Date: Apr. 7, 2022

(65) Prior Publication Data
US 2023/0367106 A1     Nov. 16, 2023

(30) Foreign Application Priority Data

Oct. 2, 2020     (JP) ................................. 2020-167999

(51) Int. Cl.
*G02B 13/02*          (2006.01)
*G02B 9/60*           (2006.01)
(52) U.S. Cl.
CPC ............... *G02B 13/02* (2013.01); *G02B 9/60* (2013.01)
(58) Field of Classification Search
CPC . G02B 9/60; G02B 9/62; G02B 13/02; G02B 13/0045; G02B 13/008; G02B 13/14; G02B 13/146

(Continued)

(56) References Cited

U.S. PATENT DOCUMENTS 4,264,138 A     4/1981  Imai
4,376,571 A     3/1983  Ikemori
(Continued)

FOREIGN PATENT DOCUMENTS

JP     44-13678 A     6/1969
JP     54-51826 A     4/1979
(Continued)

OTHER PUBLICATIONS

Gross et al. "Handbook of Optical Systems vol. 3: Aberration Theory and Correction of Optical Systems" Weinheim Germany, WILEY-VCH Verlag Gmbh & Co. KGaA, pp. 377-379 (Year: 2007). (Year: 2007).*

(Continued)

*Primary Examiner* — Marin Pichler
(74) *Attorney, Agent, or Firm* — XSENSUS LLP

(57)          ABSTRACT

An imaging lens system includes a first lens having positive power, a second lens being a meniscus lens having a convex surface on an object side, a third lens, a fourth lens being a meniscus lens having a concave surface on the object side, and a fifth lens having positive power, the first, second, third, fourth, and fifth lenses being arranged in this order from the object side, in which the first lens is a glass lens; the second, third, and fourth lenses are plastic lenses; and the imaging lens system satisfies a following Conditional Expression (1):

$$1.25 < f1/f < 1.55 \qquad (1)$$

where f is a focal length of the entire lens system and f1 is a focal length of the first lens.

19 Claims, 22 Drawing Sheets

(58) Field of Classification Search
USPC .............. 359/355, 356, 357, 350, 713, 714, 359/756–760, 764–769
See application file for complete search history.

(56) References Cited

U.S. PATENT DOCUMENTS

| 4,407,568 | A | 10/1983 | Yokota et al. | |
| 8,675,289 | B2 | 3/2014 | Tsai et al. | |
| 2013/0201568 | A1* | 8/2013 | Tsai | G02B 13/0045 359/714 |
| 2014/0254030 | A1 | 9/2014 | Hsu et al. | |
| 2015/0185446 | A1 | 7/2015 | Hsu et al. | |
| 2015/0212390 | A1 | 7/2015 | Chen et al. | |
| 2018/0164551 | A1* | 6/2018 | Kim | G02B 9/60 |
| 2019/0227283 | A1 | 7/2019 | Zhao et al. | |
| 2020/0225449 | A1* | 7/2020 | Zirkel | G02B 13/0045 |

FOREIGN PATENT DOCUMENTS

| JP | 55-163509 | A | 12/1980 |
| JP | 56-65110 | A | 6/1981 |
| JP | 56-102819 | A | 8/1981 |
| JP | 57-2013 | A | 1/1982 |
| JP | 59-71014 | A | 4/1984 |
| JP | 2019-124880 | A | 7/2019 |
| JP | 2019-191523 | A | 10/2019 |

OTHER PUBLICATIONS

International Search Report and Written Opinion mailed on Nov. 9, 2021, received for PCT Application PCT/JP2021/034477, filed on Sep. 21, 2021, 12 pages including English Translation.
Japanese Office Action issued Jul. 30, 2024, in corresponding Japanese Patent Application No. 2020-167999, 10pp.
Japanese Office Action issued Mar. 26, 2024, in corresponding Japanese Patent Application No. 2020-167999, 8pp.

* cited by examiner

Field Curvature

Fig. 3

IMAGING LENS SYSTEM AND CAPTURING APPARATUS

CROSS-REFERENCE TO RELATED APPLICATIONS

The present application is based on PCT filing PCT/JP2021/034477, filed Sep. 21, 2021, which claims priority to JP 2020-167999, filed Oct. 2, 2020, the entire contents of each are incorporated herein by reference.

TECHNICAL FIELD

The present invention relates to an imaging lens system and a capturing apparatus.

BACKGROUND ART

In recent years, there has been a demand that cameras used in digital cameras and mobile phones be equipped with imaging optical systems having a higher resolution.

As such an imaging lens system, Patent Literature 1 discloses an imaging lens system composed of five plastic lenses and having an Fno of about 1.8.

CITATION LIST

Patent Literature

Patent Literature 1: Japanese Unexamined Patent Application Publication 2019-124880

SUMMARY OF INVENTION

Technical Problem

The imaging lens system disclosed in Patent Literature 1 can only properly work by using an autofocus mechanism, so that there is a problem that it is necessary to correct a focus shift caused by a change in distance to an object or a change in temperature by using some mechanism.

The present invention has been made in view of the above-described problem, and an object thereof is to provide a telephoto lens-type imaging lens system having a small Fno and a large aperture, and being capable of correcting a thermal focus shift caused by temperature change in an environment, and a capturing apparatus equipped with such an imaging lens system.

Solution to Problem

An imaging lens system according to an embodiment includes a first lens having positive power, a second lens being a meniscus lens having a convex surface on an object side, a third lens, a fourth lens being a meniscus lens having a concave surface on the object side, and a fifth lens having positive power, the first, second, third, fourth, and fifth lenses being arranged in this order from the object side, in which the first lens is a glass lens, the second, third, and fourth lenses are plastic lenses, and the imaging lens system satisfies a following Conditional Expression (1):

$$1.25 < f1/f < 1.55 \tag{1}$$

where f is a focal length of the entire lens system and f1 is a focal length of the first lens.

According to the imaging lens system in accordance with an embodiment, it is possible to provide a telephoto lens-type imaging lens system having a small Fno and a large aperture, and being capable of correcting a thermal focus shift caused by temperature change in an environment, and a capturing apparatus equipped with such an imaging lens system.

Advantageous Effects of Invention

According to the present invention, it is possible to provide a telephoto lens-type imaging lens system having a small Fno and a large aperture, and being capable of correcting a thermal focus shift caused by temperature change in an environment, and a capturing apparatus equipped with such an imaging lens system.

BRIEF DESCRIPTION OF DRAWINGS

FIG. 3 shows a field curvature in the imaging lens system according to Example 1;

DESCRIPTION OF EMBODIMENTS

Figure 1:
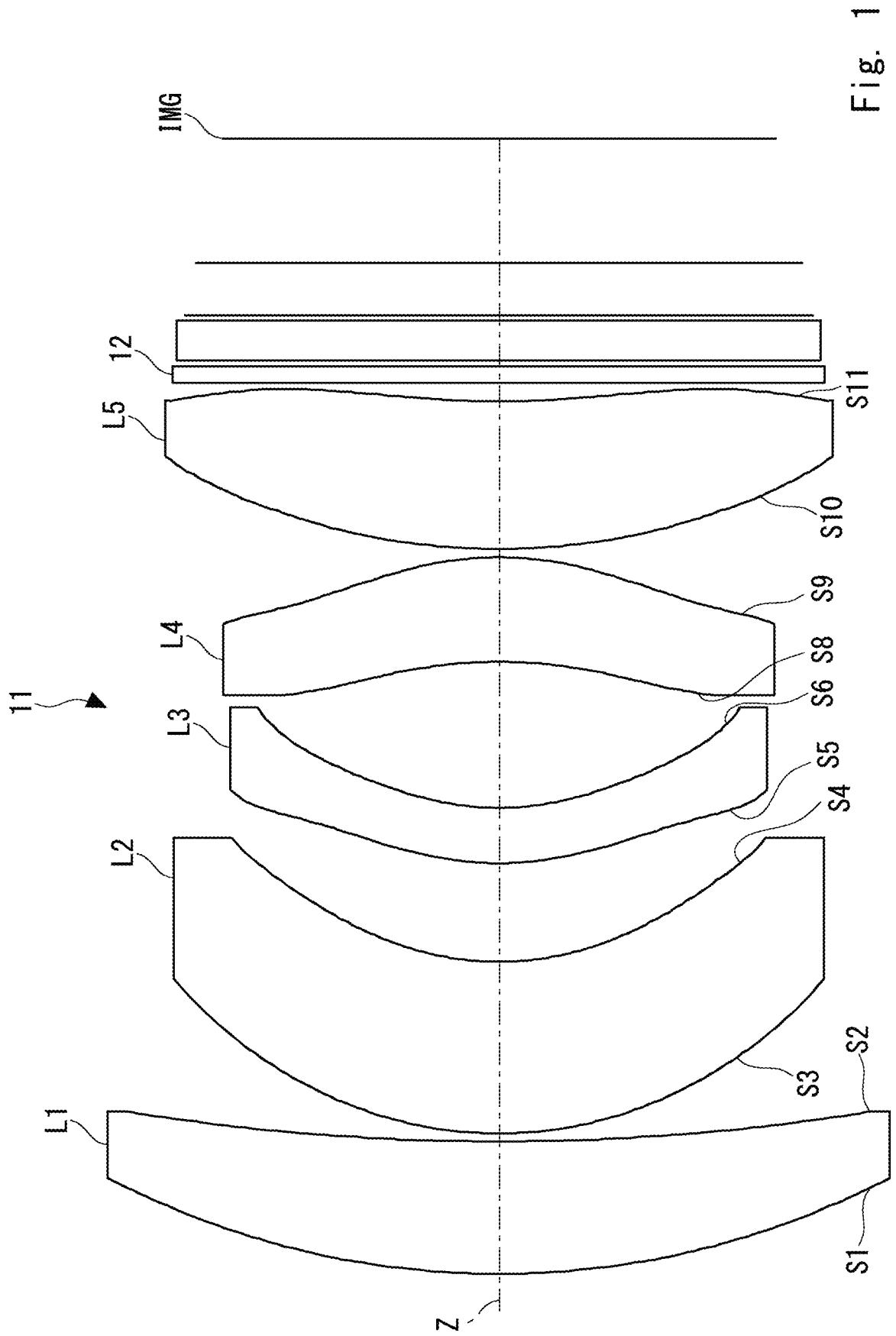
FIG. 1 is a cross-sectional diagram showing a configuration of an imaging lens system according to Example 1.

Optical lenses and a capturing apparatus according to an embodiment will be described hereinafter.

First Embodiment: Imaging Lens System

An imaging lens system according to a first embodiment includes a first lens L1 having positive power, a second lens L2 being a meniscus lens having a convex surface on the object side, a third lens L3, a fourth lens L4 being a meniscus lens having a concave surface on the object side, and a fifth lens L5 having positive power, the first, second, third, fourth, and fifth lenses L1, L2, L3, L4, and L5 being arranged in this order from the object side. The first lens L1 is a glass lens, and the second, third, and fourth lenses L2, L3, and L4 are plastic lenses. Further, the imaging lens system satisfies the following Conditional Expression (1):

$$1.25 < f1/f < 1.55 \qquad (1)$$

where f is the focal length of the entire lens system and f1 is the focal length of the first lens L1.

As described above, according to the imaging lens system in accordance with the first embodiment, since the focal length f1 of the first lens L1 is set so that it affects (or controls) the imaging state of the lens system, it is possible to prevent correction of the focus shift caused by environmental change from becoming impossible, which would otherwise become impossible when the focal length of the first lens L1 decreases, relative to the focal length of the entire lens system, beyond the lower limit of the conditional expression and hence the correction of a thermal focus shift become excessive or when it increases, relative to the focal length of the entire lens system, beyond the upper limit of the conditional expression and hence the correction of a thermal focus shift become insufficient. As a result, it is possible to perform the correction of a thermal focus shift without using any mechanical focus adjustment.

The imaging lens system according to the above-described first embodiment may satisfy the following Conditional Expressions (2) and (3):

$$|f/f2| < 0.3 \qquad (2)$$

$$|f/f3| < 0.3 \qquad (3)$$

where f2 is the focal length of the second lens L2 and f3 is the focal length of the third lens L3.

As described above, according to the imaging lens system in accordance with the first embodiment, it is possible to prevent correction of the focus shift from becoming difficult, which would otherwise become difficult because, when the focal length becomes shorter (exceeds the upper limit value), the imaging performance (imaging properties) is affected more significantly, thus improving the efficiency of correction of aberration when the correction of a thermal focus shift is performed.

The imaging lens system according to the above-described first embodiment may satisfy the following Conditional Expression (4):

$$0.1 < bf/tol < 0.3 \qquad (4)$$

where tol is the total track length of the lens system and bf is the distance between the last lens and the focal plane.

As described above, according to the imaging lens system in accordance with the first embodiment, it is possible to prevent the influence of the focus shift caused by the change of the focal length of the fifth lens L5 caused by temperature change from increasing, which would otherwise increase when the distance bf between the last lens and the focal plane becomes longer (exceeds the upper limit value), and to prevent the arrangement of the image sensor becoming difficult, which would otherwise become difficult when the distance bf between the last lens and the focal plane is short.

In the imaging lens system according to the above-described first embodiment, the fifth lens L5 may have a convex shape on the object side and its image-side surface may have an inflection point.

As described above, according to the imaging lens system in accordance with the first embodiment, it is possible to effectively correct the field curvature.

Next, examples corresponding to the imaging lens system according to the first embodiment will be described with reference to the drawings.

Example 1

FIG. 1 is a cross-sectional diagram showing a configuration of an imaging lens system according to Example 1. In FIG. 1, an imaging lens system 11 includes a first lens L1, a second lens L2, a third lens L3, a fourth lens L4, and a fifth lens L5, which are arranged in this order from the object side toward the image side. The focal plane of the imaging lens system 11 is indicated by an abbreviation "IMG".

The first lens L1 is a spherical glass lens having positive power. The object-side lens surface S1 of the first lens L1 is a convex surface facing the object side. The image-side lens surface S2 of the first lens L1 is a concave surface facing the image side.

The second lens L2 is an aspherical plastic meniscus lens having negative power. The object-side lens surface S3 of the second lens L2 is a convex surface facing the object side. Further, the image-side lens surface S4 of the second lens L2 is a concave surface facing the image side.

The third lens L3 is an aspherical plastic lens having negative power. The object-side lens surface S5 of the third lens L3 is a convex surface facing the object side. Further, the image-side lens surface S6 of the third lens L3 is a concave surface facing the image side.

The fourth lens L4 is an aspherical plastic meniscus lens having positive power. The object-side lens surface S9 of the fourth lens L4 is a concave surface facing the object side. The image-side lens surface S10 of the fourth lens L4 is a convex surface facing the image side.

The fifth lens L5 is an aspherical plastic lens having positive power. The object-side lens surface S11 of the fifth lens L5 is a concave surface facing the object side, and its image-side surface has an inflection point. Further, the image-side lens surface S12 of the fifth lens L5 has a concave curved part facing the image side.

An IR filter 12 is a bandpass filter that lets light in an infrared region pass therethrough. When the imaging lens system 11 is designed, the imaging lens system 11 and the IR filter 12 are handled as one integrated component. However, the IR filter 12 is not an essential component of the imaging lens system 11.

Table 1 shows lens data of each lens surface in the imaging lens system 11 according to Example 1. Table 1 shows, as the lens data of each lens surface, a curvature radius (mm), a thickness (mm) between surfaces on the central optical axis, a refractive index Nd for a d-line, and an Abbe's number Vd for the d-line. Surfaces marked with "*" are aspherical surfaces. Further, in Table 1, for example, "−6.522528E−03" means "−6.522528×10⁻³". The above-described numerical expression applies to other tables shown later.

TABLE 1

Example 1

| | | Curvature Radius | Thickness | Nd (Refractive Index) | Vd (Abbe's Number) |
|---|---|---|---|---|---|
| Lens Surface S1 | | 14.289 | 2.309 | 2.00070 | 25.5 |
| Lens Surface S2 | | 39.466 | 0.149 | | |
| Lens Surface S3 | * | 6.734 | 3.007 | 1.63490 | 24.0 |
| Lens Surface S4 | * | 4.868 | 1.724 | | |
| Lens Surface S5 | * | 5.250 | 0.967 | 1.63490 | 24.0 |
| Lens Surface S6 | * | 4.701 | 2.561 | | |
| Lens Surface S7 | * | −7.664 | 1.829 | 1.53650 | 55.8 |
| Lens Surface S8 | * | −5.419 | 0.148 | | |
| Lens Surface S9 | * | 11.326 | 2.583 | 1.53650 | 55.8 |
| Lens Surface S10 | * | 13.649 | 0.310 | | |
| Cover Surface S11 | | 0.000 | 0.300 | 1.51680 | 64.2 |
| Cover Surface S12 | | 0.000 | 0.200 | | |
| Cover Surface S13 | | 0.000 | 0.700 | 1.51680 | 64.2 |
| IMG | | 0.000 | 3.073 | | |

The aspherical surface shape adopted for the lens surface is expressed by the below-shown expression, in which: z is a sag: c is the inverse of the radius of the curvature; K is a conic constant; r is a height of a ray from an optical axis Z; and A4, A6, A8, A10, A12, A14, and A16 are 4th, 6th, 8th, 10th, 12th, 14th, and 16th order aspherical surface coefficients, respectively.

$$z = \frac{cr^2}{1 + \sqrt{1 - (1 + K)c^2 r^2}} + A4r^4 + $$
$$A6r^6 + A8r^8 + A10r^{10} + A12r^{12} + A14r^{14} + A16r^{16}$$

Table 2 shows aspherical surface coefficients for defining aspherical surface shapes of aspherical lens surfaces in the imaging lens system 11 according to Example 1.

TABLE 2

Example 1
Aspherical Coefficient

| | Third Surface | Fourth Surface | Fifth Surface | Sixth Surface |
|---|---|---|---|---|
| K | 0.00000E+00 | 0.00000E+00 | 0.00000E+00 | 0.00000E+00 |
| A4 | −1.59261E−04 | −1.19686E−03 | −3.03465E−03 | −2.86103E−03 |
| A6 | −1.63543E−06 | −1.37916E−05 | −5.52316E−05 | −6.09763E−05 |
| A8 | −1.24961E−08 | −8.45080E−07 | −5.07811E−07 | 4.65661E−06 |
| A10 | −3.47570E−10 | −6.30235E−08 | 1.00278E−07 | −1.62616E−08 |
| A12 | −5.17813E−11 | 3.13307E−10 | 1.32198E−09 | 1.10372E−10 |
| A14 | −5.85359E−13 | 0.00000E+00 | 0.00000E+00 | 1.27253E−10 |
| A16 | 2.16767E−14 | 0.00000E+00 | 0.00000E+00 | 0.00000E+00 |

| | Seventh Surface | Eighth Surface | Ninth Surface | Tenth Surface |
|---|---|---|---|---|
| K | 0.00000E+00 | 0.00000E+00 | 0.00000E+00 | 0.00000E+00 |
| A4 | 5.53372E−04 | 2.33814E−03 | −4.62284E−05 | −2.31324E−03 |
| A6 | 1.25351E−04 | 4.33470E−05 | 1.45723E−05 | 7.83138E−05 |
| A8 | 2.78300E−07 | 1.55166E−06 | −9.22298E−07 | −2.08045E−06 |

TABLE 2-continued

Example 1
Aspherical Coefficient

| A10 | −1.42604E−07 | 3.27023E−09 | 1.12317E−08 | 1.08454E−08 |
|---|---|---|---|---|
| A12 | −1.57939E−09 | −7.34118E−09 | −2.89487E−10 | −9.97192E−10 |
| A14 | 1.78799E−10 | 1.52931E−10 | 3.73900E−11 | 9.60516E−11 |
| A16 | −4.39091E−12 | 4.48323E−13 | −6.92266E−13 | −1.66E−12 |

Figure 2:
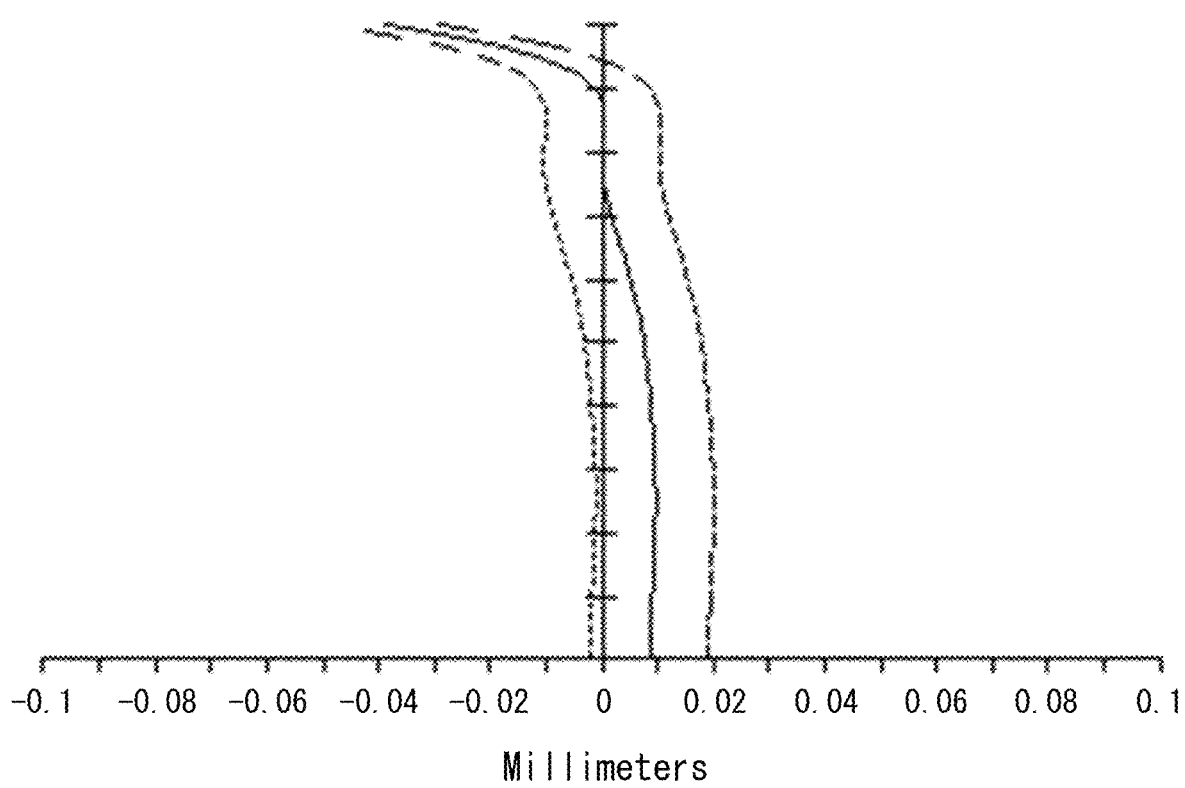
FIG. 2 shows a spherical aberration in the imaging lens system according to Example 1.

Next, an aberration will be described with reference to the drawings. FIG. 2 shows a spherical aberration in the imaging lens system according to Example 1. In FIG. 2, the horizontal axis indicates positions at which the ray intersects the optical axis Z, and the vertical axis indicates heights at a certain pupil radius. Further, FIG. 2 shows, from the left, results of simulations of rays having wavelengths of 800 nm, 810 nm, and 820 nm, respectively.

Figure 3:
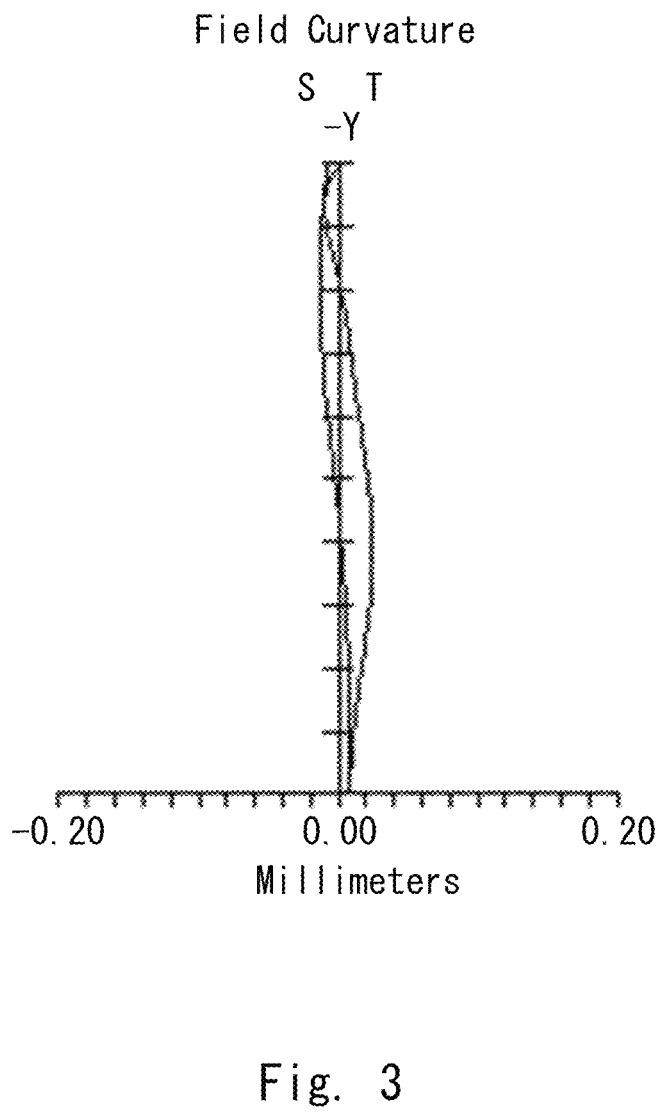

FIG. 3 shows a field curvature in the imaging lens system according to Example 1. In FIG. 3, the horizontal axis indicates distances in the direction of the optical axis Z, and the vertical axis indicates image heights (fields of view). Further, in FIG. 3, S represents astigmatism on a sagittal plane, and T represents astigmatism in a tangential plane. Further, FIG. 3 shows a result of a simulation of a ray having a wavelength of 810 nm.

Figure 4:
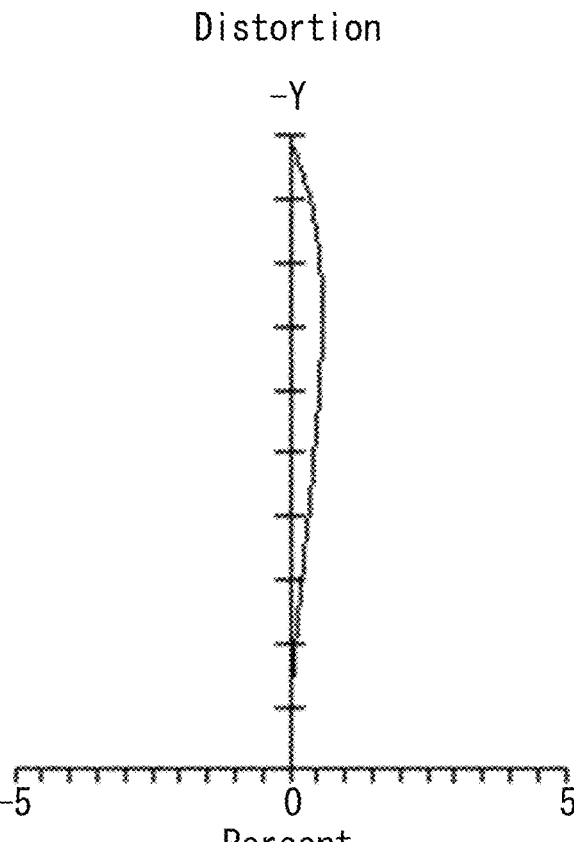
FIG. 4 shows a distortion in the imaging lens system according to Example 1.

FIG. 4 shows a distortion in the imaging lens system according to Example 1. In FIG. 4, the horizontal axis indicates distortion amounts (%) of an image, and the vertical axis indicates image heights (fields of view). As shown in FIGS. 2 to 4, it can be understood that the aberration is satisfactorily corrected.

Next, characteristic values of lenses will be described. Table 3 shows results of calculation of characteristic values of the imaging lens system 11 according to Example 1. Table 3 shows various characteristic values in the imaging lens system 11, in which the focal length of the entire lens system is represented by f; the focal length of the first lens L1 is represented by f1; the focal length of the second lens L2 is represented by f2; the focal length of the third lens L3 is represented by f3; the focal length of the fourth lens L4 is represented by f4; the focal length of the fifth lens L5 is represented by f5; the total track length of the lens system is represented by tol; the distance between the last lens and the focal plane is represented by bf; a value obtained by dividing the focal length of the first lens L1 by the focal length of the entire lens system is expressed as f1/f; the absolute value of a value obtained by dividing the focal length of the second lens L2 by the focal length of the entire lens system is expressed as |f/f2|; the absolute value of a value obtained by dividing the focal length of the third lens L3 by the focal length of the entire lens system is expressed as |f/f3|; and a value obtained by dividing the total track length of the lens system by the distance between the last lens and the focal plane is expressed as bf/tol. In Table 3, units for the focal lengths and the center thicknesses are both mm. Further, various focal lengths in Table 3 were calculated by using a ray having a wavelength of 810 nm.

TABLE 3

Example 1

| | Value |
|---|---|
| f | 16.000 |
| f1 | 21.999 |
| f2 | −74.010 |

TABLE 3-continued

| Example 1 | |
| --- | --- |
| | Value |
| f3 | −222.981 |
| f4 | 27.237 |
| f5 | 90.711 |
| tol | 19.860 |
| bf | 4.584 |
| f1/f | 1.375 |
| \|f/f2\| | 0.216 |
| \|f/f3\| | 0.072 |
| bf/tol | 0.2308 |

Figure 5:
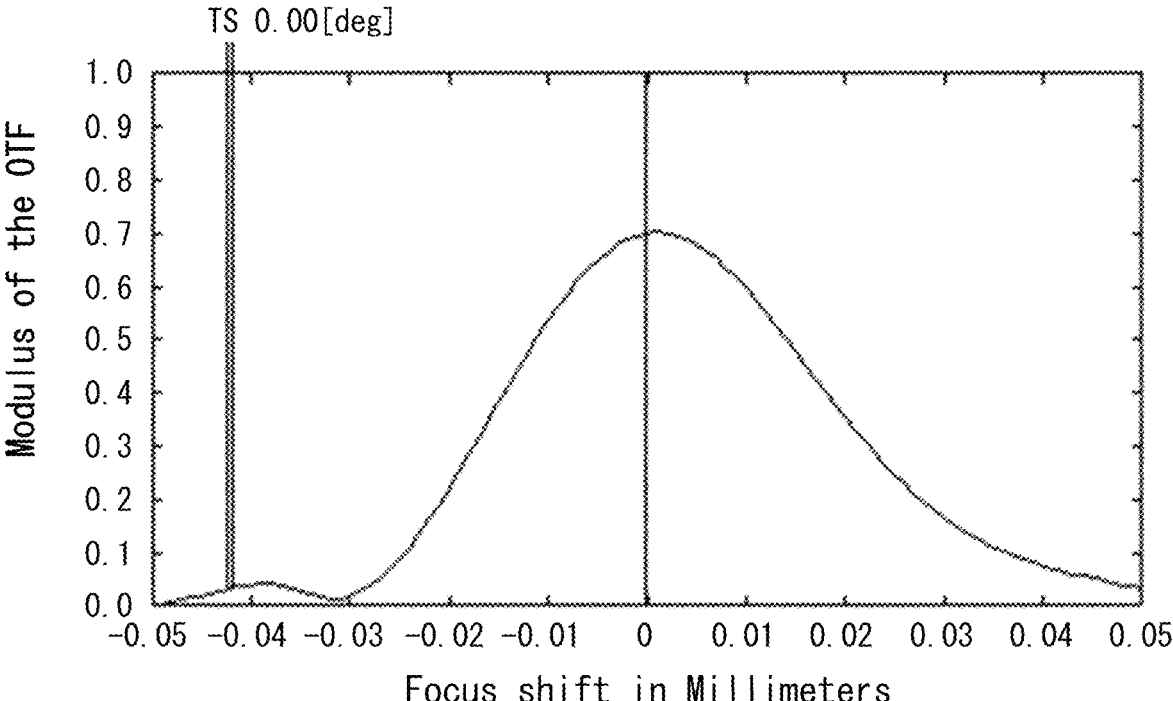
FIG. 5 is a graph showing a relationship between spatial frequencies and MTFs at 25° C. in the imaging lens system according to Example 1.
Figure 6:
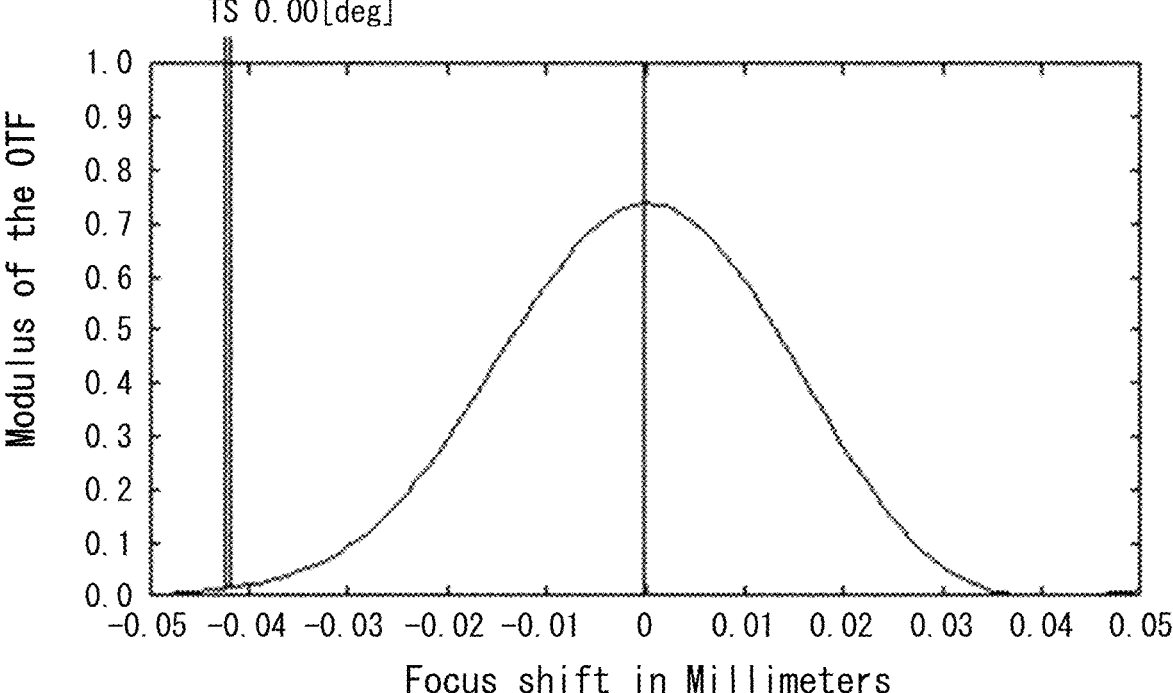
FIG. 6 is a graph showing a relationship between spatial frequencies and MTFs at −40° C. in the imaging lens system according to Example 1.
Figure 7:
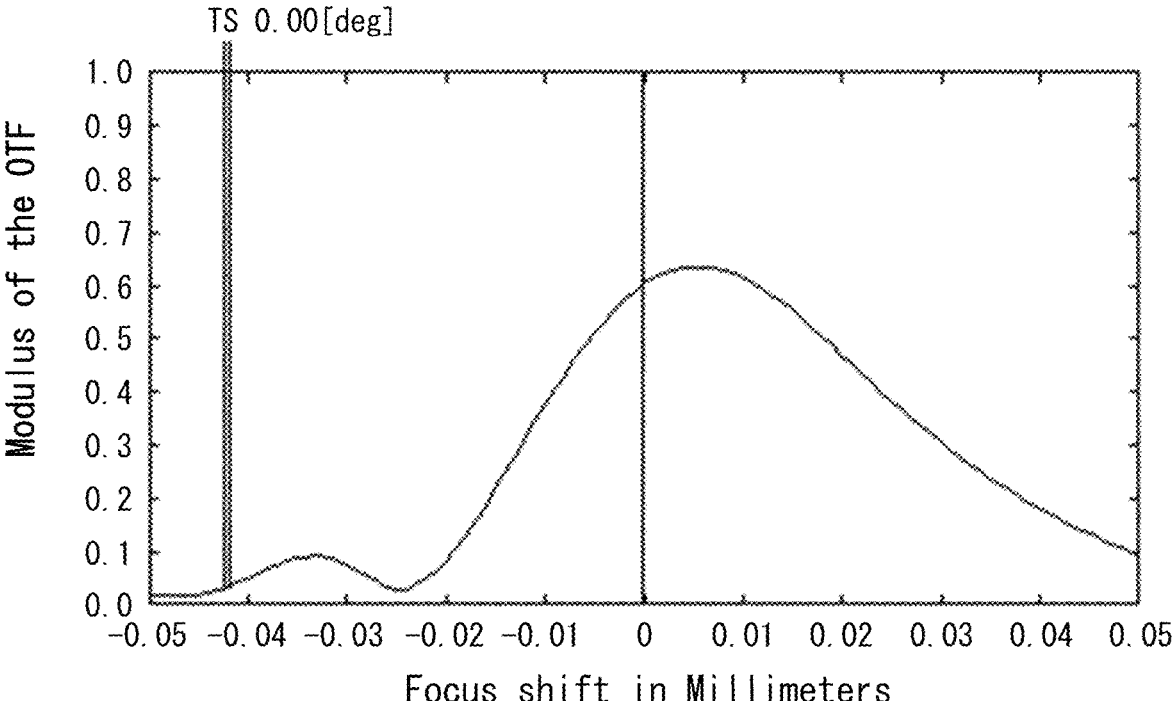
FIG. 7 is a graph showing a relationship between spatial frequencies and MTFs at 85° C. in the imaging lens system according to Example 1.

FIG. 5 is a graph showing a relationship between spatial frequencies and MTFs at 25° C. in the imaging lens system according to Example 1. FIG. 6 is a graph showing a relationship between spatial frequencies and MTFs at −40° C. in the imaging lens system according to Example 1. FIG. 7 is a graph showing a relationship between spatial frequencies and MTFs at 85° C. in the imaging lens system according to Example 1. In FIGS. 5 to 7, the vertical axes indicate MTFs (Modulation Transfer Functions). Further, the horizontal axes indicate focus shifts. FIGS. 5 to 7 show relationships between focus shifts and MTFs for different temperatures.

Example 2

Figure 8:
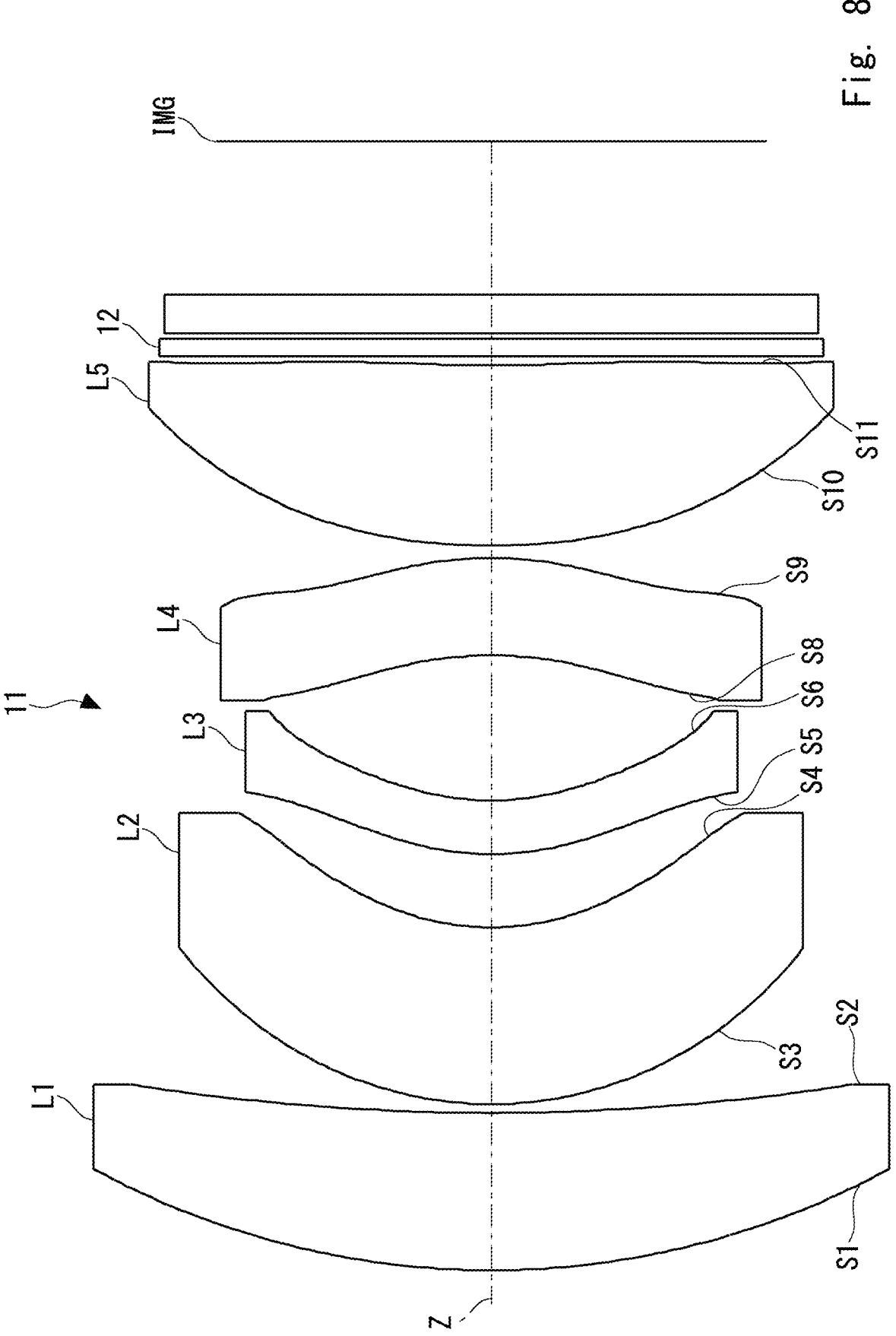
FIG. 8 is a cross-sectional diagram showing a configuration of an imaging lens system according to Example 2.

FIG. 8 is a cross-sectional diagram showing a configuration of an imaging lens system according to Example 2. In FIG. 8, an imaging lens system 11 includes a first lens L1 having positive power, a second lens L2 having negative power, a third lens L3 having positive power, a fourth lens L4 having positive power, and a fifth lens L5 having positive power, which are arranged in this order from the object side toward the image side. The focal plane of the imaging lens system 11 is indicated by an abbreviation "IMG". Further, the imaging lens system 11 may include an IR filter 12. Further, the shape and material of each of the lenses are similar to those in Example 1.

Table 4 shows lens data of each lens surface in the imaging lens system 11 according to Example 2. Table 4 shows, as the lens data of each lens surface, a curvature radius (mm), a thickness (mm) between surfaces on the central optical axis, a refractive index Nd for a d-line, and an Abbe's number Vd for the d-line. Surfaces marked with "*" are aspherical surfaces.

TABLE 4

| Example 2 | | | | |
| --- | --- | --- | --- | --- |
| | | Curvature Radius | Thickness | Nd (Refractive Index) | Vd (Abbe's Number) |
| Lens Surface S1 | | 14.213 | 2.780 | 2.00070 | 25.5 |
| Lens Surface S2 | | 39.721 | 0.150 | | |
| Lens Surface S3 | * | 6.419 | 3.122 | 1.63490 | 24.0 |
| Lens Surface S4 | * | 4.432 | 1.293 | | |
| Lens Surface S5 | * | 4.814 | 0.946 | 1.63490 | 24.0 |
| Lens Surface S6 | * | 4.585 | 2.562 | | |
| Lens Surface S7 | * | −6.297 | 1.721 | 1.53650 | 55.8 |
| Lens Surface S8 | * | −5.945 | 0.216 | | |
| Lens Surface S9 | * | 11.369 | 3.186 | 1.53650 | 55.8 |
| Lens Surface S10 | * | 32.053 | 0.155 | | |
| Cover Surface S11 | | 0.000 | 0.300 | 1.51680 | 64.2 |
| Cover Surface S12 | | 0.000 | 0.100 | | |

TABLE 4-continued

| Example 2 | | | | |
| --- | --- | --- | --- | --- |
| | Curvature Radius | Thickness | Nd (Refractive Index) | Vd (Abbe's Number) |
| Cover Surface S13 | 0.000 | 0.700 | 1.5168 | 64.2 |
| IMG | 0.000 | 2.662 | | |

Table 5 shows aspherical surface coefficients for defining aspherical surface shapes of aspherical lens surfaces in the imaging lens system 11 according to Example 2. In Table 5, the aspherical surface shape adopted for the lens surface is expressed by an expression similar to that in Example 2.

TABLE 5

| Example 2 Aspherical Coefficient | | | | |
| --- | --- | --- | --- | --- |
| | Third Surface | Fourth Surface | Fifth Surface | Sixth Surface |
| K | −9.94966E−01 | −1.65147E−01 | −2.84254E−02 | 1.66630E−01 |
| A4 | 3.37139E−04 | −9.61238E−04 | −2.99604E−03 | −3.10725E−03 |
| A6 | 6.07968E−06 | −3.39455E−05 | −5.42169E−05 | −5.01307E−05 |
| A8 | 0.00000E+00 | 1.95870E−06 | −1.18434E−06 | −7.03232E−07 |
| A10 | 1.44662E−09 | −2.62748E−07 | 0.00000E+00 | 4.75360E−07 |
| A12 | 0.00000E+00 | 0.00000E+00 | 0.00000E+00 | −1.55762E−08 |
| A14 | 0.00000E+00 | 0.00000E+00 | 0.00000E+00 | 0.00000E+00 |
| A16 | 0.00000E+00 | 0.00000E+00 | 0.00000E+00 | 0.00000E+00 |
| | Seventh Surface | Eighth Surface | Ninth Surface | Tenth Surface |
| K | −3.38744E−01 | −5.51048E−01 | 0.00000E+00 | 0 |
| A4 | 5.37171E−04 | 2.56022E−03 | 8.91064E−04 | −0.001356025 |
| A6 | 1.74643E−04 | 2.82972E−05 | −1.48921E−05 | 3.55774E−05 |
| A8 | 1.04668E−05 | 9.65405E−06 | 1.75050E−07 | 1.62493E−07 |
| A10 | −2.24828E−06 | −8.29278E−07 | 4.15177E−10 | −3.74248E−08 |
| A12 | 1.41717E−07 | 1.41601E−08 | 0.00000E+00 | 1.44466E−09 |
| A14 | −3.73673E−09 | 0.00000E+00 | 0.00000E+00 | −2.01432E−11 |
| A16 | 0.00000E+00 | 0.00000E+00 | 0.00000E+00 | 0 |

Figure 9:
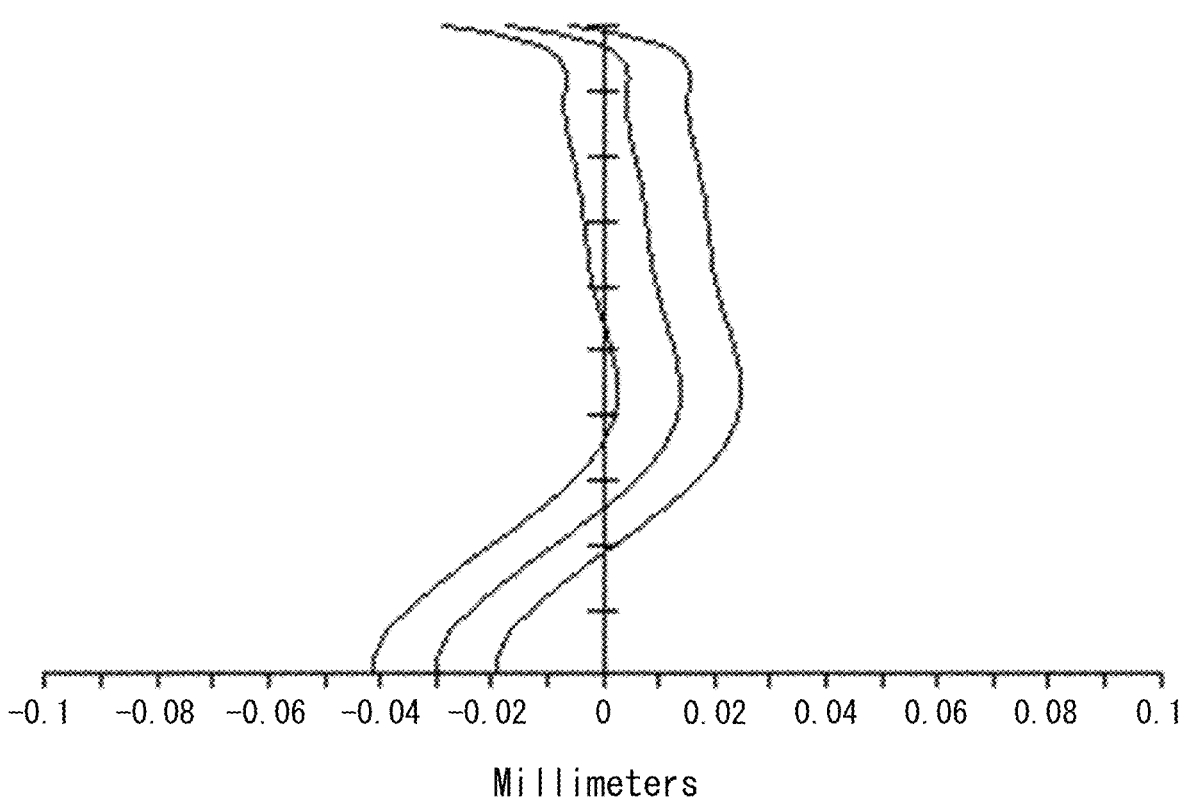
FIG. 9 shows a spherical aberration in the imaging lens system of Example 2.

Next, an aberration will be described with reference to the drawings. FIG. 9 shows a spherical aberration in the imaging lens system according to Example 2. In FIG. 9, the horizontal axis indicates positions at which the ray intersects the optical axis Z, and the vertical axis indicates heights at a certain pupil radius. Further, FIG. 9 shows, from the left, results of simulations of rays having wavelengths of 800 nm, 810 nm, and 820 nm, respectively.

Figure 10:
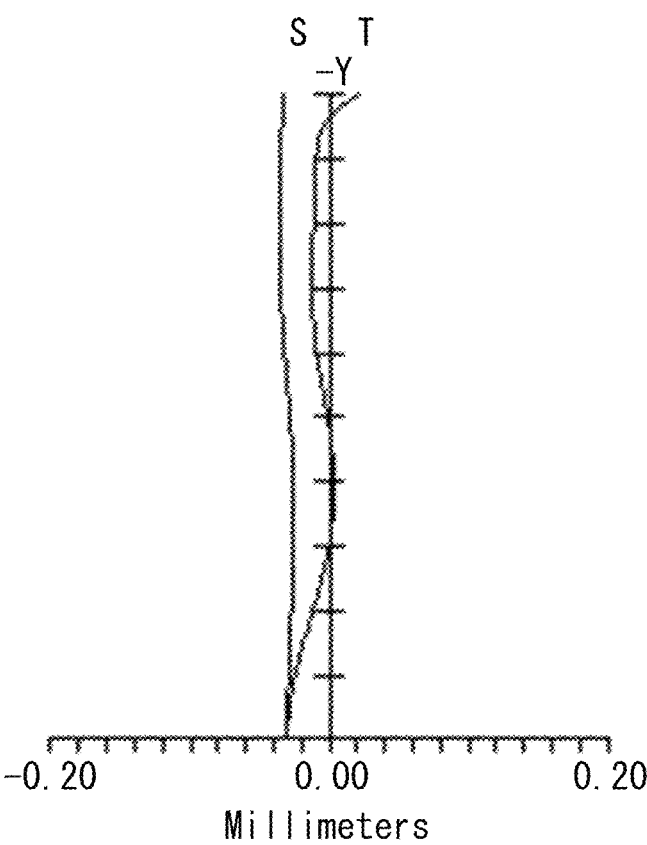
FIG. 10 shows a field curvature in the imaging lens system of Example 2.

FIG. 10 shows a field curvature in the imaging lens system according to Example 2. In FIG. 10, the horizontal axis indicates distances in the direction of the optical axis Z, and the vertical axis indicates image heights (fields of view). Further, in FIG. 10, S represents astigmatism on a sagittal plane, and T represents astigmatism in a tangential plane. Further, FIG. 3 shows a result of a simulation of a ray having a wavelength of 810 nm.

Figure 11:
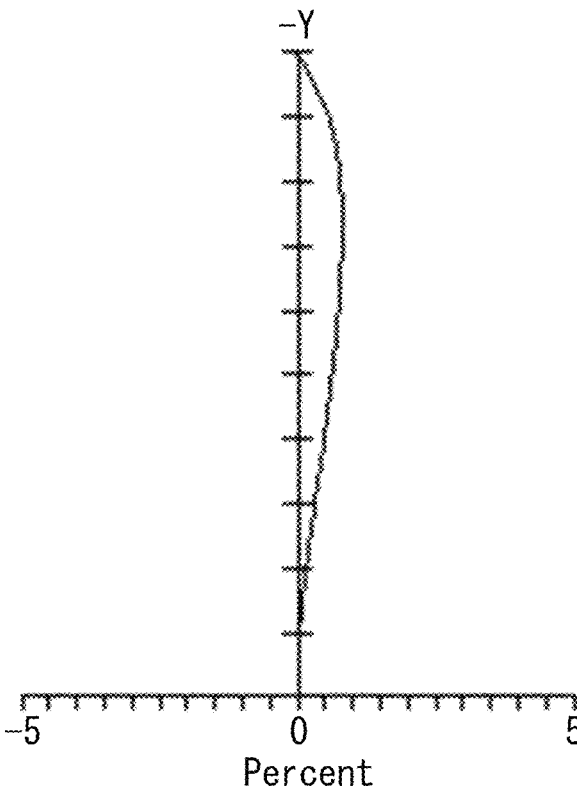
FIG. 11 shows a distortion in the imaging lens system of Example 2.

FIG. 11 shows a distortion in the imaging lens system according to Example 2. In FIG. 11, the horizontal axis indicates distortion amounts (%) of an image, and the vertical axis indicates image heights (fields of view).

As shown in FIGS. 9 to 11, it can be understood that the aberration is satisfactorily corrected.

Next, characteristic values of lenses will be described. Table 6 shows results of calculation of characteristic values of the imaging lens system 11 according to Example 2. The items in Table 6 show characteristic values of items similar to those in Table 3. Further, various focal lengths in Table 6 were calculated by using a ray having a wavelength of 810 nm.

TABLE 6

| | Example 2 | |
|---|---|---|
| | | Value |
| f | | 16.030 |
| f1 | | 21.561 |
| f2 | | −57.920 |
| f3 | | 271.128 |
| f4 | | 74.555 |
| f5 | | 31.571 |
| tol | | 19.894 |
| bf | | 3.917 |
| f1/f | | 1.345 |
| |f/f2| | | 0.277 |
| |f/f3| | | 0.059 |
| bf/tol | | 0.1969 |

Figure 12:
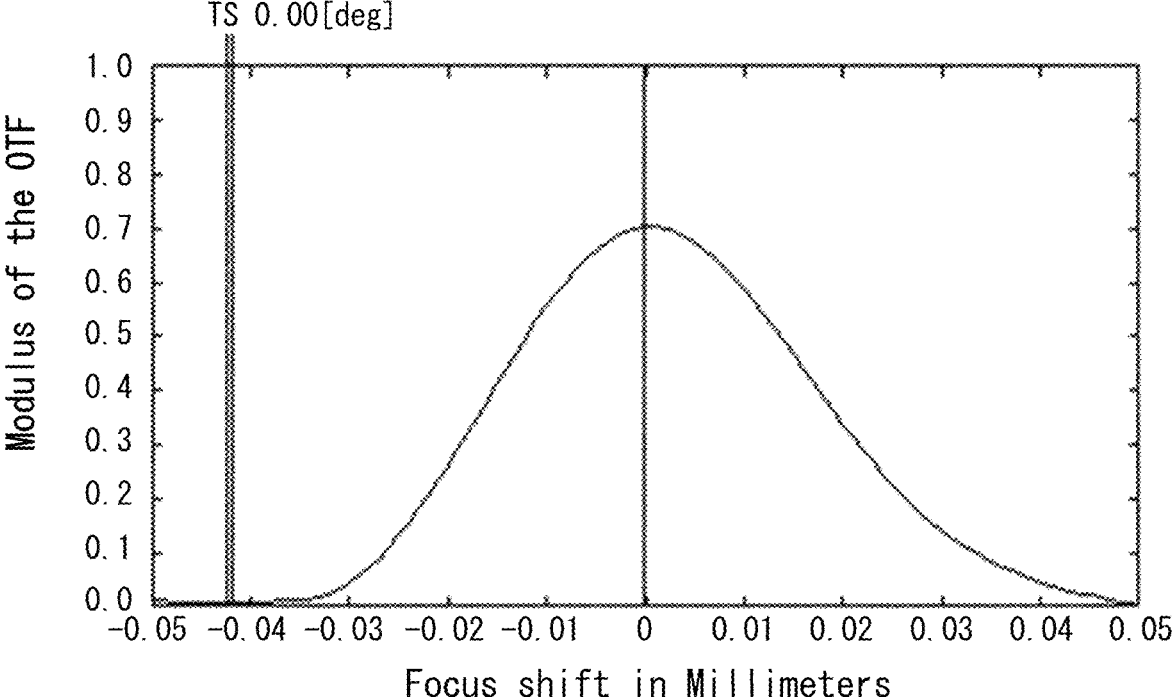
FIG. 12 is a graph showing a relationship between spatial frequencies and MTFs at 25° C. in the imaging lens system of Example 2.
Figure 13:
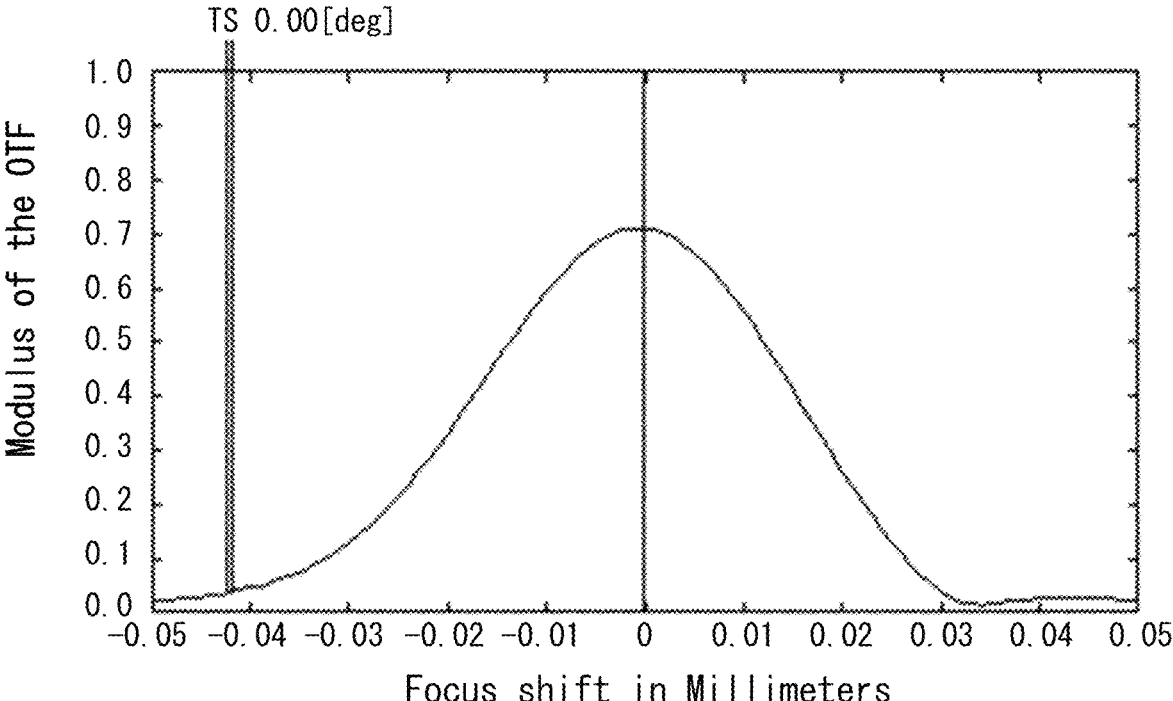
FIG. 13 is a graph showing a relationship between spatial frequencies and MTFs at −40° C. in the imaging lens system of Example 2.
Figure 14:
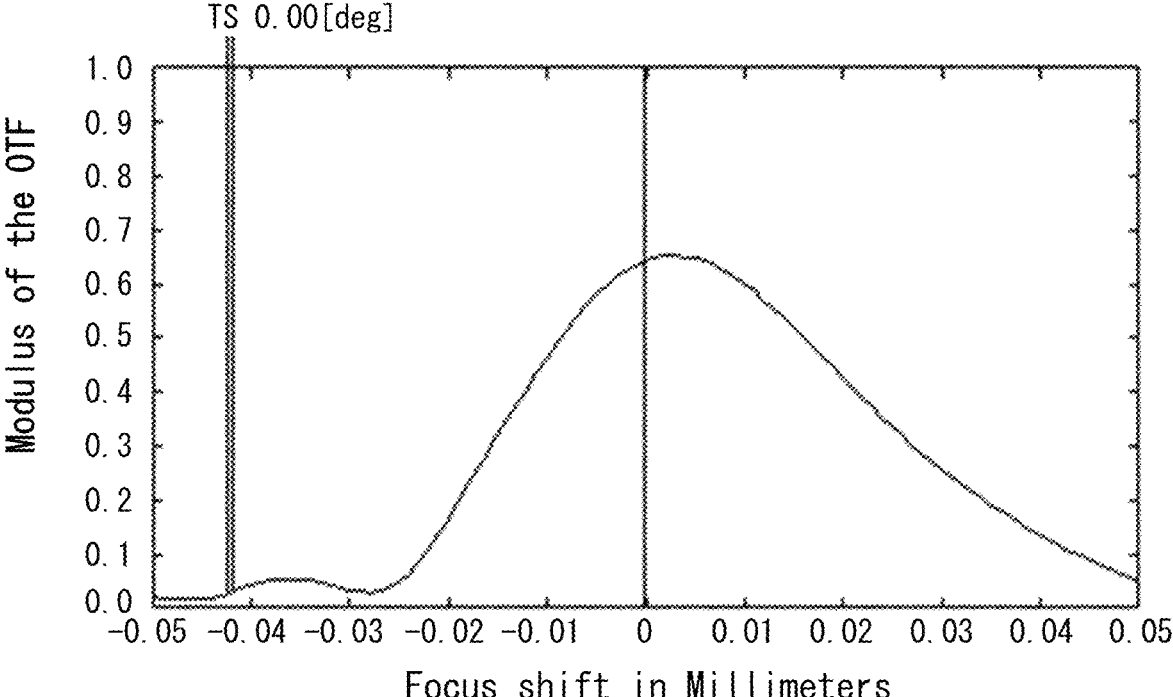
FIG. 14 is a graph showing a relationship between spatial frequencies and MTFs at 85° C. in the imaging lens system of Example 2.

FIG. 12 is a graph showing a relationship between spatial frequencies and MTFs at 25° C. in the imaging lens system according to Example 2. FIG. 13 is a graph showing a relationship between spatial frequencies and MTFs at −40° C. in the imaging lens system according to Example 2. FIG. 14 is a graph showing a relationship between spatial frequencies and MTFs at 85° C. in the imaging lens system according to Example 2. In FIGS. 12 to 14, the vertical axes indicate MTFs (Modulation Transfer Functions). Further, the horizontal axes indicate focus shifts. FIGS. 12 to 14 show relationships between focus shifts and MTFs for different temperatures.

Example 3

Figure 15:
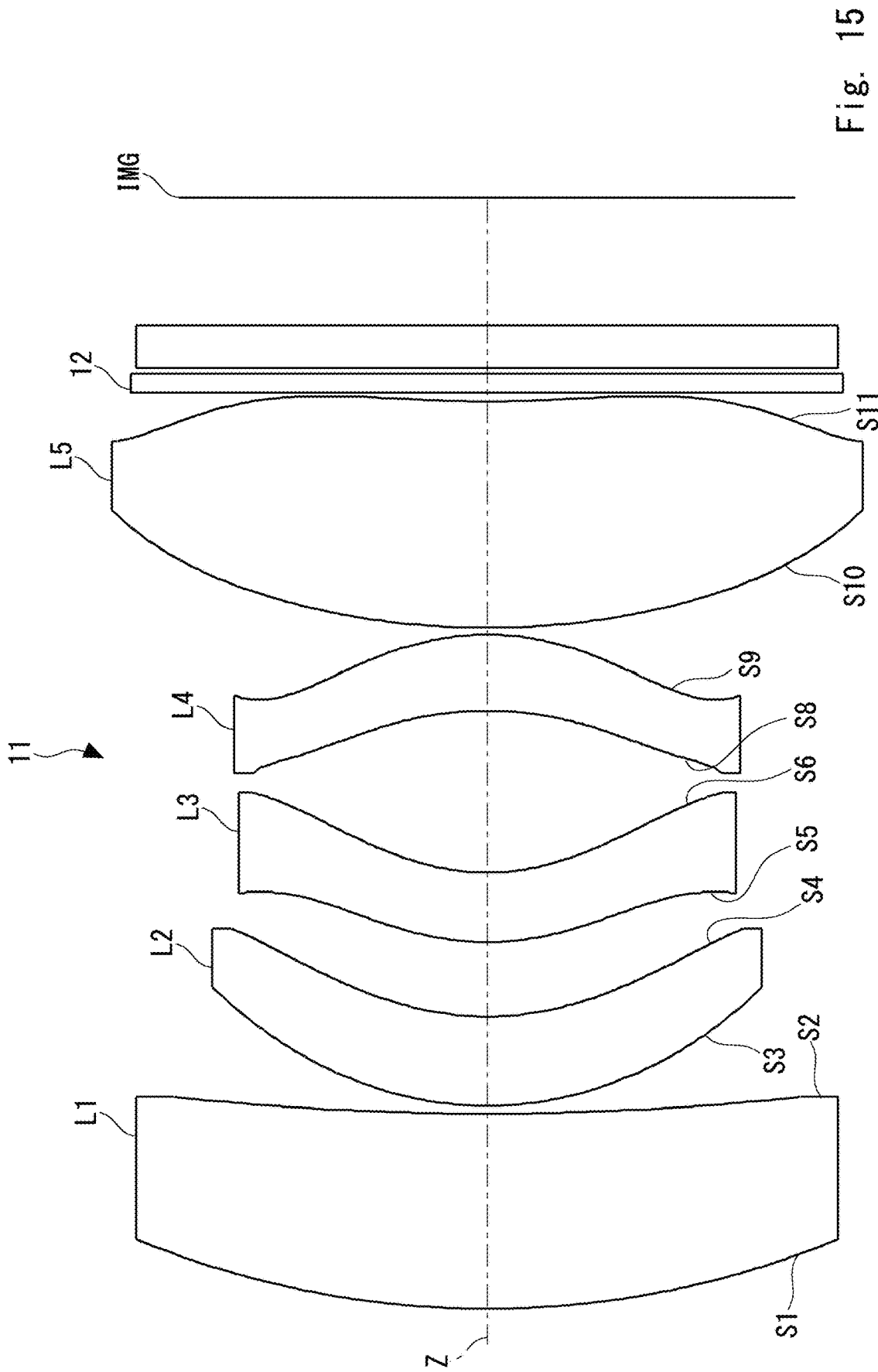
FIG. 15 is a cross-sectional diagram showing a configuration of an imaging lens system of Example 3.

FIG. 15 is a cross-sectional diagram showing a configuration of an imaging lens system according to Example 3. In FIG. 15, an imaging lens system 11 includes a first lens L1 having positive power, a second lens L2 having negative power, a third lens L3 having positive power, a fourth lens L4 having positive power, and a fifth lens L5 having positive power, which are arranged in this order from the object side toward the image side. The focal plane of the imaging lens system 11 is indicated by an abbreviation "IMG". Further, the imaging lens system 11 may include an IR filter 12. Further, the shape and material of each of the lenses are similar to those in Example 3.

Table 7 shows lens data of each lens surface in the imaging lens system 11 according to Example 3. Table 7 shows, as the lens data of each lens surface, a curvature radius (mm), a surface thickness (mm) on the central optical axis, a refractive index Nd for a d-line, and an Abbe's number Vd for the d-line. Surfaces marked with "*" are aspherical surfaces.

TABLE 7

| | | Example 3 | | | |
|---|---|---|---|---|---|
| | | Curvature Radius | Thickness | Nd (Refractive Index) | Vd (Abbe's Number) |
| Lens Surface S1 | | 13.692 | 3.149 | 2.00070 | 25.5 |
| Lens Surface S2 | | 44.822 | 0.121 | | |
| Lens Surface S3 | * | 5.161 | 1.438 | 1.63490 | 24.0 |
| Lens Surface S4 | * | 4.256 | 1.201 | | |
| Lens Surface S5 | * | 3.907 | 1.117 | 1.63490 | 24.0 |

TABLE 7-continued

| | | Example 3 | | | |
|---|---|---|---|---|---|
| | | Curvature Radius | Thickness | Nd (Refractive Index) | Vd (Abbe's Number) |
| Lens Surface S6 | * | 3.361 | 2.613 | | |
| Lens Surface S7 | * | −5.125 | 1.222 | 1.53650 | 55.8 |
| Lens Surface S8 | * | −3.904 | 0.116 | | |
| Lens Surface S9 | * | 12.620 | 3.642 | 1.53650 | 55.8 |
| Lens Surface S10 | * | 17.037 | 0.137 | | |
| Cover Surface S11 | | 0.000 | 0.300 | 1.51680 | 64.2 |
| Cover Surface S12 | | 0.000 | 0.100 | | |
| Cover Surface S13 | | 0.000 | 0.700 | 1.51680 | 64.2 |
| IMG | | 0.000 | 2.033 | | |

Table 8 shows aspherical surface coefficients for defining aspherical surface shapes of aspherical lens surfaces in the imaging lens system 11 according to Example 3. In Table 8, the aspherical surface shape adopted for the lens surface is expressed by an expression similar to that in Example 3.

TABLE 8

| | Example 3 Aspherical Coefficient | | | |
|---|---|---|---|---|
| | Third Surface | Fourth Surface | Fifth Surface | Sixth Surface |
| K | −1.15171E−01 | −1.08232E−01 | −2.95761E−01 | −3.40094E−01 |
| A4 | −6.67927E−04 | −3.17126E−03 | −4.76003E−03 | −3.84800E−03 |
| A6 | 1.08055E−05 | 1.96178E−05 | −2.25879E−04 | −4.12224E−04 |
| A8 | −4.27631E−07 | −3.50970E−06 | −1.12087E−08 | 1.32792E−05 |
| A10 | −5.62246E−09 | −1.58695E−07 | 3.70006E−08 | 5.64076E−07 |
| A12 | −8.20052E−11 | 4.97596E−10 | 1.22427E−08 | −7.04885E−08 |
| A14 | −1.95217E−12 | −7.46954E−12 | −1.40045E−11 | −5.45238E−11 |
| A16 | −5.31251E−13 | −1.91314E−12 | 0.00000E+00 | 0.00000E+00 |
| | Seventh Surface | Eighth Surface | Ninth Surface | Tenth Surface |
| K | 0.00000E+00 | −3.17096E−01 | 0.00000E+00 | 0.00000E+00 |
| A4 | 6.25149E−05 | 2.53482E−03 | 4.29594E−04 | −3.13404E−03 |
| A6 | 2.28443E−04 | 8.00042E−05 | −1.61550E−05 | 1.29065E−04 |
| A8 | 1.31906E−05 | 1.12667E−05 | 7.33417E−08 | −6.86600E−06 |
| A10 | −2.61345E−07 | 7.89873E−07 | 3.92617E−08 | 1.90722E−07 |
| A12 | 3.91110E−09 | −5.07155E−08 | −1.07704E−09 | −1.70366E−09 |
| A14 | −4.96604E−09 | 1.27216E−10 | 6.19762E−12 | 7.87499E−12 |
| A16 | 0.00000E+00 | 0.00000E+00 | 4.69470E−14 | −2.35968E−13 |

Figure 16:
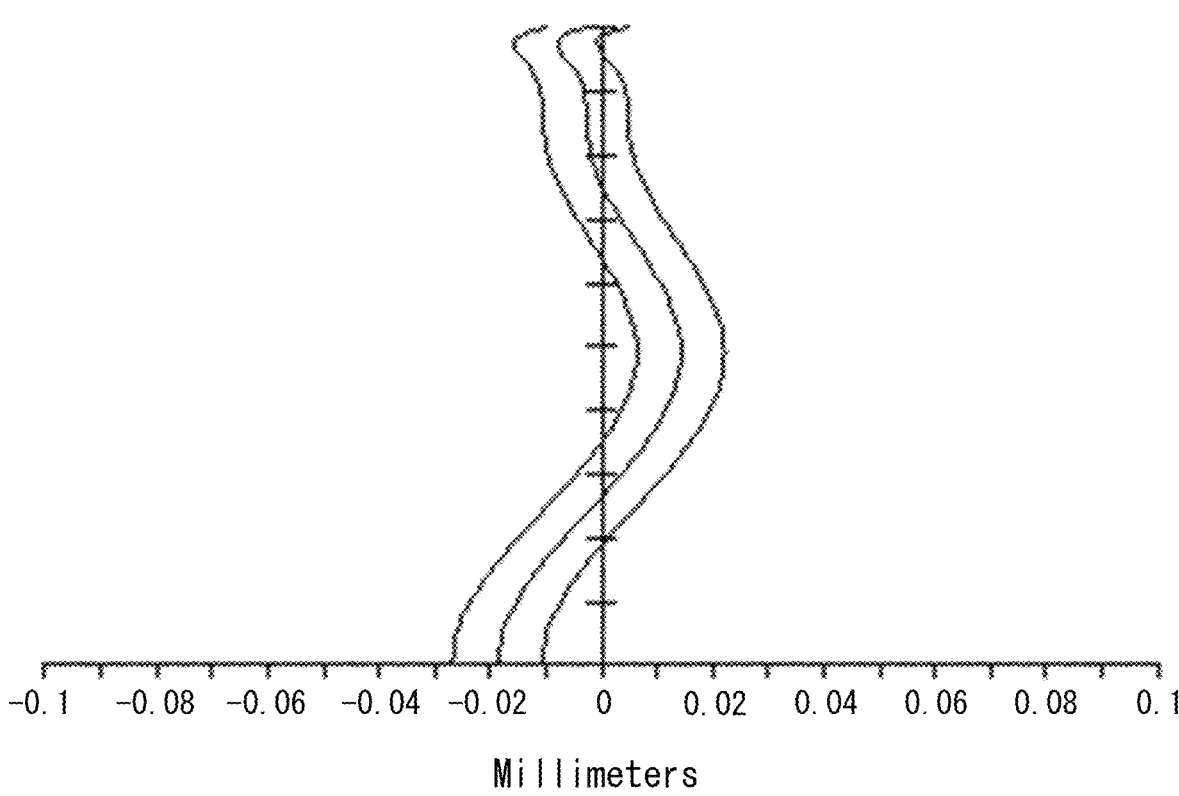
FIG. 16 shows a spherical aberration in the imaging lens system of Example 3.

Next, an aberration will be described with reference to the drawings. FIG. 16 shows a spherical aberration in the imaging lens system according to Example 3. In FIG. 16, the horizontal axis indicates positions at which the ray intersects the optical axis Z, and the vertical axis indicates heights at a certain pupil radius. Further, FIG. 16 shows, from the left, results of simulations of rays having wavelengths of 800 nm, 810 nm, and 820 nm, respectively.

Figure 17:
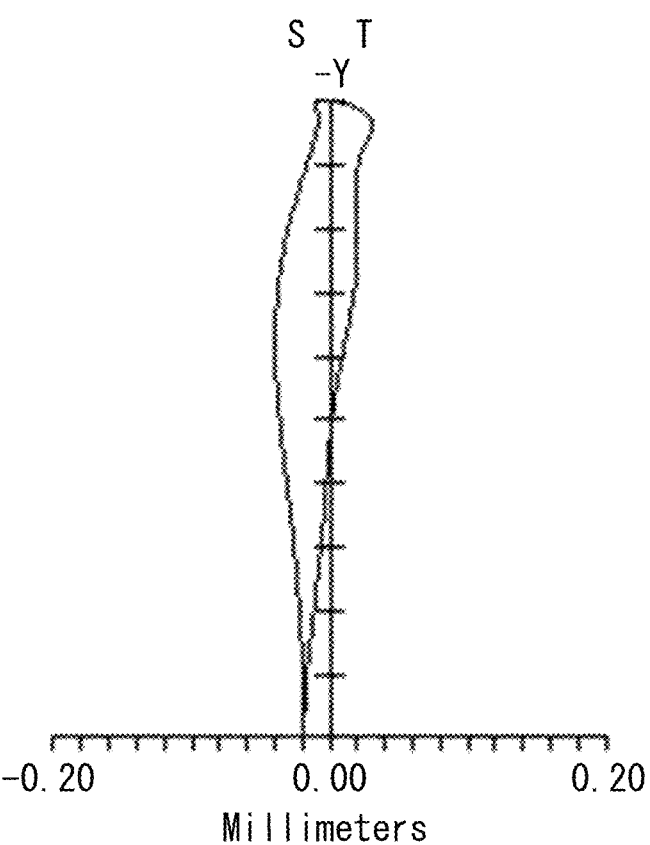
FIG. 17 shows a field curvature in the imaging lens system of Example 3.

FIG. 17 shows a field curvature in the imaging lens system according to Example 3. In FIG. 17, the horizontal axis indicates distances in the direction of the optical axis Z, and the vertical axis indicates image heights (fields of view). Further, in FIG. 17, S represents astigmatism on a sagittal plane, and T represents astigmatism in a tangential plane. Further, FIG. 3 shows a result of a simulation of a ray having a wavelength of 810 nm.

Figure 18:
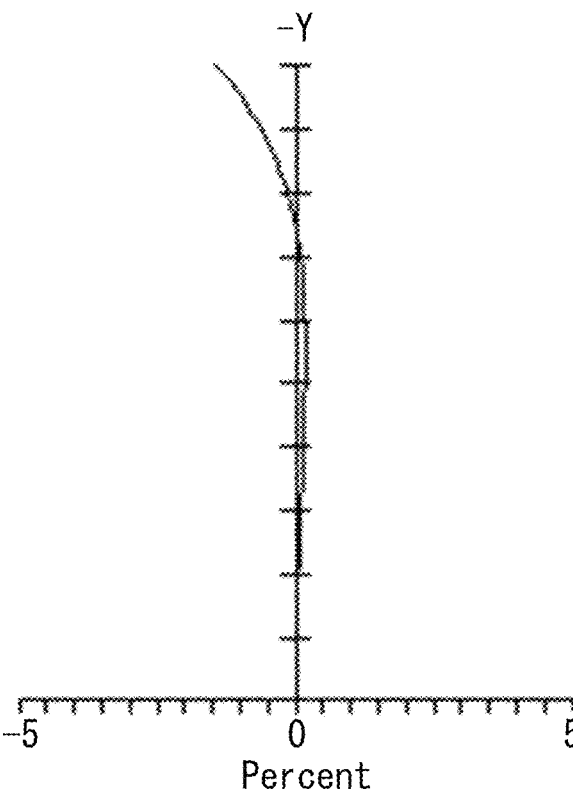
FIG. 18 shows a distortion in the imaging lens system of Example 3.

FIG. 18 shows a distortion in the imaging lens system according to Example 3. In FIG. 18, the horizontal axis indicates distortion amounts (%) of an image, and the vertical axis indicates image heights (fields of view).

As shown in FIGS. 16 to 18, it can be understood that the aberration is satisfactorily corrected.

Next, characteristic values of lenses will be described. Table 9 shows results of calculation of characteristic values of the imaging lens system 11 according to Example 3. The items in Table 9 show characteristic values of items similar to those in Table 3. Further, various focal lengths in Table 9 were calculated by using a ray having a wavelength of 810 nm.

TABLE 9

| Example 3 | |
|---|---|
| | Value |
| f | 13.100 |
| f1 | 19.274 |
| f2 | −99.932 |
| f3 | −178.443 |
| f4 | 22.976 |
| f5 | 71.476 |
| tol | 17.891 |
| bf | 3.270 |
| f1/f | 1.471 |
| |f/f2| | 0.131 |
| |f/f3| | 0.073 |
| bf/tol | 0.1828 |

Figure 19:
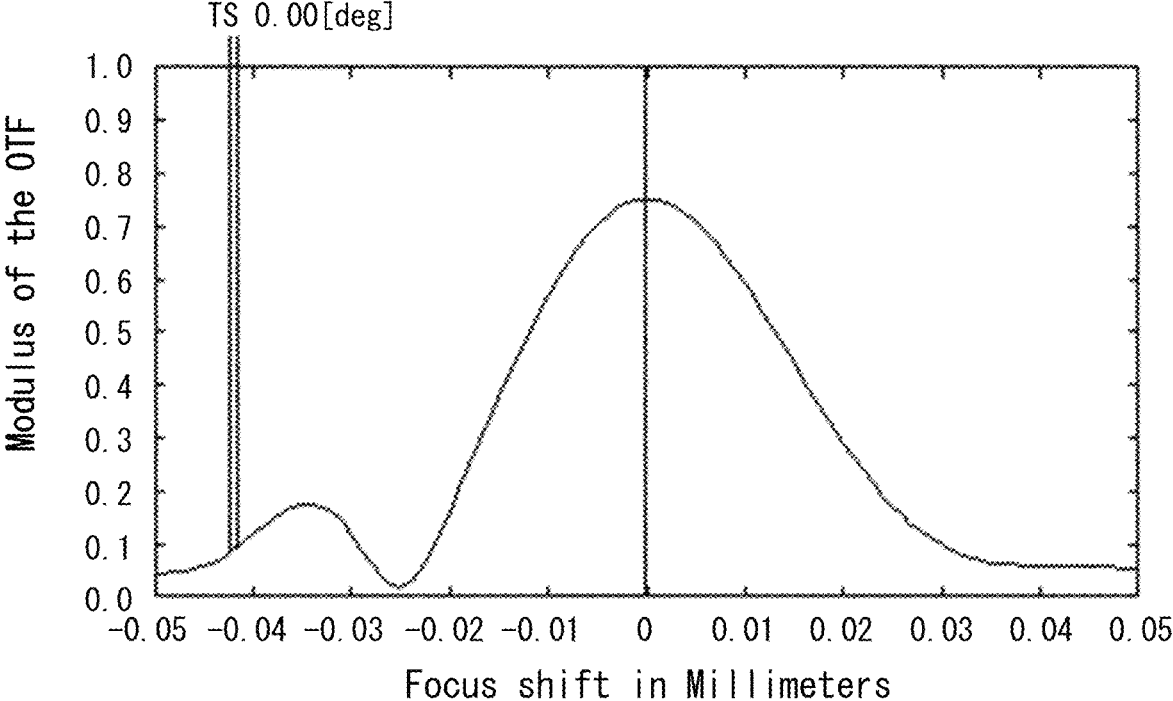
FIG. 19 is a graph showing a relationship between spatial frequencies and MTFs at 25° C. in the imaging lens system of Example 3.
Figure 20:
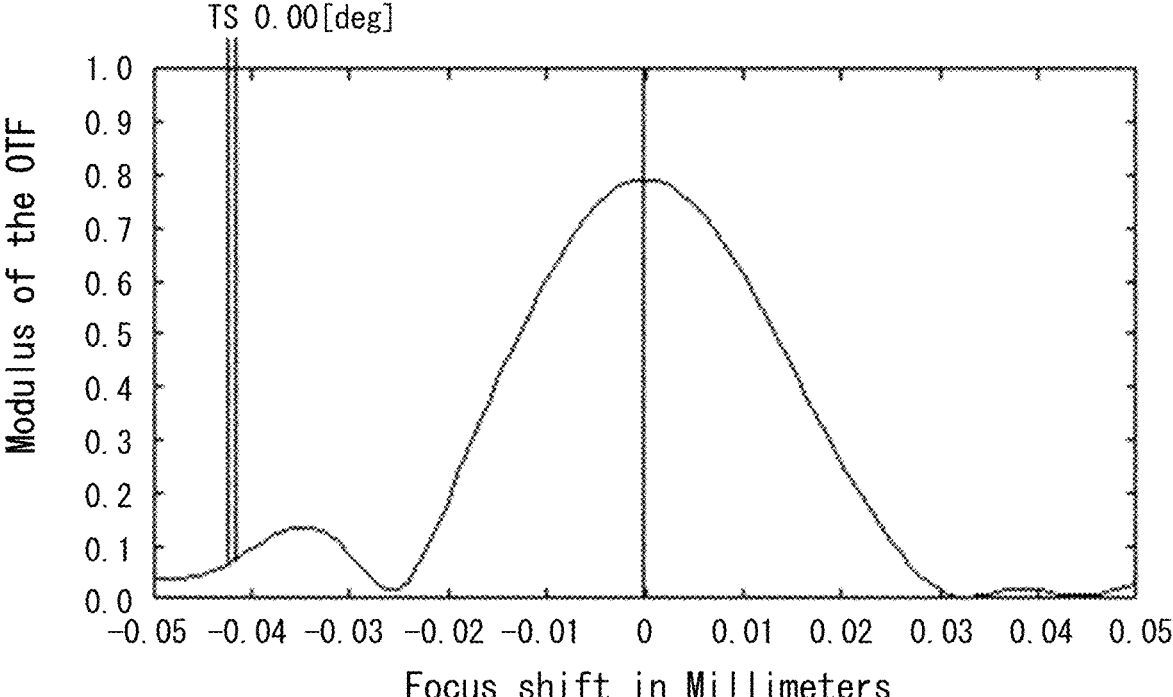
FIG. 20 is a graph showing a relationship between spatial frequencies and MTFs at −40° C. in the imaging lens system of Example 3.
Figure 21:
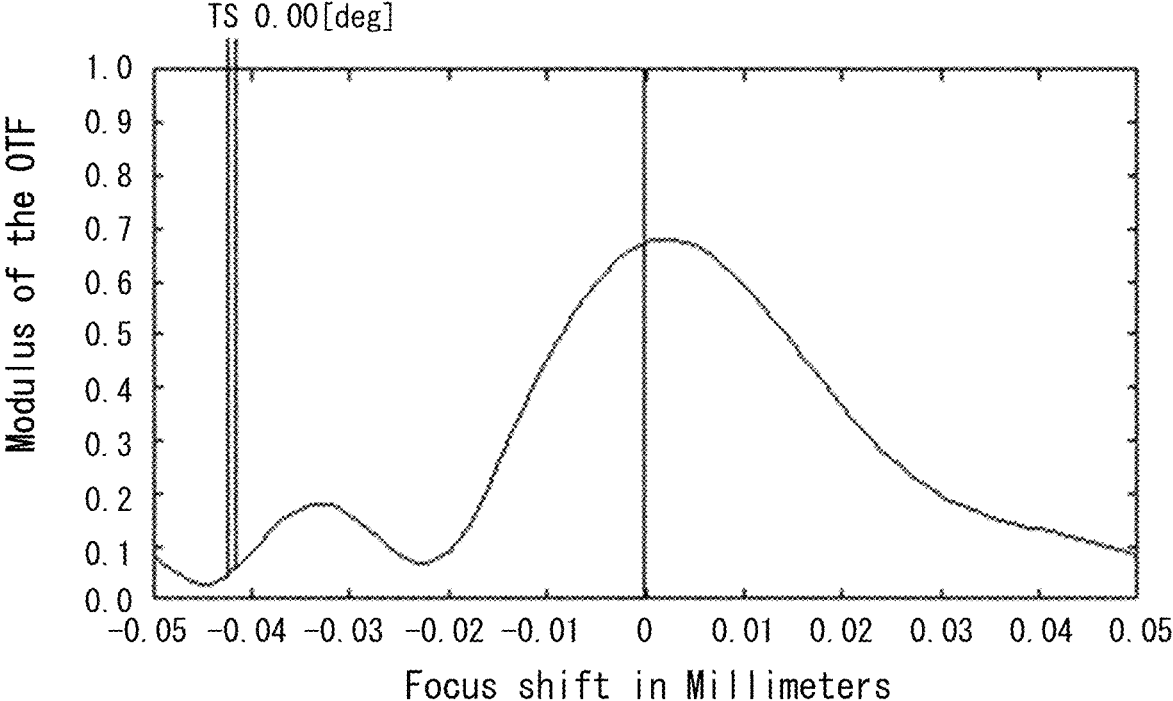
FIG. 21 is a graph showing a relationship between spatial frequencies and MTFs at 85° C. in the imaging lens system of Example 3.

FIG. 19 is a graph showing a relationship between spatial frequencies and MTFs at 25° C. in the imaging lens system according to Example 3. FIG. 20 is a graph showing a relationship between spatial frequencies and MTFs at −40° C. in the imaging lens system according to Example 3. FIG. 21 is a graph showing a relationship between spatial frequencies and MTFs at 85° C. in the imaging lens system according to Example 3. In FIGS. 19 to 21, the vertical axes indicate MTFs (Modulation Transfer Functions). Further, the horizontal axes indicate focus shifts. FIGS. 19 to 21 show relationships between focus shifts and MTFs for different temperatures.

Second Embodiment: Example of Application to Imaging Apparatus

Figure 22:
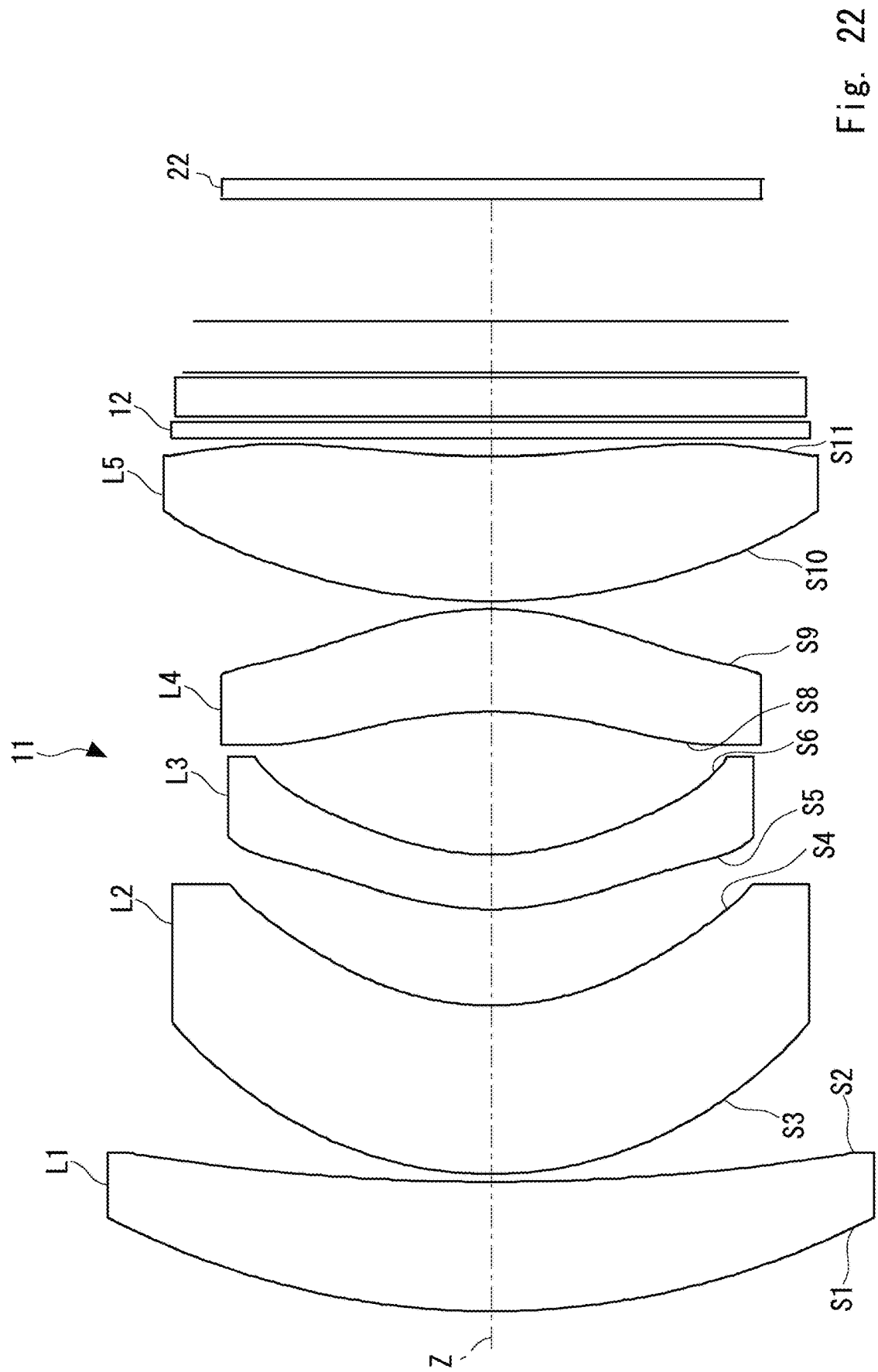
FIG. 22 is a cross-sectional diagram of a capturing apparatus according to a second embodiment.

In FIG. 22, a capturing apparatus 21 includes an imaging lens system 11 and a capturing element 22. The imaging lens system 11 and the capturing element 22 are housed in a housing (not shown). The imaging lens system 11 is the same as the imaging lens system 11 described in the above-described first embodiment.

The capturing element 22 is an element that converts received light into an electrical signal. For example, a CCD image sensor or a CMOS image sensor is used as the capturing element 22. The capturing element 22 is disposed at the imaging position of the imaging lens system 11.

In this way, according to the capturing apparatus in accordance with the second embodiment, it is possible to provide a telephoto lens-type imaging lens system having a small Fno and a large aperture, and being capable of correcting a thermal focus shift caused by temperature change in an environment, and a capturing apparatus equipped with such an imaging lens system.

Note that the present invention is not limited to the above-described examples, and they can be modified as appropriate without departing from the scope and spirit of the invention. For example, Example 2 may be applied to Examples 1 and 3. For example, the use of the imaging lens system according to the present invention is not limited to vehicle-mounted cameras and surveillance cameras, but can also be used for other uses such as cameras or the like used in compact electronic apparatuses such as mobile phones.

Further, the present invention is suitable for not only those using visible light but also those using infrared light (especially those using near infrared light). For example, the present invention is suitable for LIDAR (Laser Imaging Detection and Ranging) in which scattering light of pulsed radiation of laser irradiation is measured, and the distance to a remote object and/or properties of the object are analyzed.

This application is based upon and claims the benefit of priority from Japanese patent application No. 2020-167999, filed on Oct. 2, 2020, the disclosure of which is incorporated herein in its entirety by reference.

INDUSTRIAL APPLICABILITY

It is possible to provide a telephoto lens-type imaging lens system having a small Fno and a large aperture, and being capable of correcting a thermal focus shift caused by temperature change in an environment, and a capturing apparatus equipped with such an imaging lens system.

REFERENCE SIGNS LIST

11 IMAGING LENS SYSTEM
12 IR FILTER
21 CAPTURING APPARATUS
22 CAPTURING ELEMENT
L1 FIRST LENS
L2 SECOND LENS
L3 THIRD LENS
L4 FOURTH LENS
L5 FIFTH LENS
IMG IMAGING PLANE

The invention claimed is:

1. An imaging lens system consisting of a first lens having positive power, a second lens being a meniscus lens having a convex surface on an object side, a third lens, a fourth lens being a meniscus lens having a concave surface on the object side, and a fifth lens having positive power, the first, second, third, fourth, and fifth lenses being arranged in this order from the object side, wherein the first lens is a glass lens, the second, third, and fourth lenses are plastic lenses, and the imaging lens system satisfies a following Conditional Expressions (1), (2) and (3):

$$1.25 < f1/f < 1.55 \tag{1}$$

$$|f/f2| < 0.3 \tag{2); and}$$

$$f/f3| < 0.3 \tag{3},$$

where f is a focal length of the entire lens system and f1 is a focal length of the first lens, f2 is a focal length of the second lens, and f3 is a focal length of the third lens.

2. The imaging lens system according to claim 1, wherein the imaging lens system satisfies a below-shown Conditional Expression (4):

$$0.1 < bf/tol < 0.3 \tag{4}$$

where tol is a total track length of the lens system and bf is a distance between a last lens and a focal plane.

3. The imaging lens system according to claim 1, wherein the fifth lens has a convex shape on the object side and its image-side surface has an inflection point.

4. A capturing apparatus comprising:

the imaging lens system according to claim 1; and a capturing element disposed at a focal point of the imaging lens system.

5. The imaging lens system according to claim 1, wherein the third lens is a meniscus lens having a convex surface on an object side.

6. The imaging lens system according to claim 1, wherein the second lens has negative power.

7. The imaging lens system according to claim 1, wherein the fourth lens has positive power.

8. The imaging lens system according to claim 1, wherein the fifth lens is a plastic lens.

9. The imaging lens system according to claim 1, wherein an object-side lens surface of the first lens is a convex surface.

10. The imaging lens system according to claim 1, wherein an image-side lens surface of the first lens is a concave surface.

11. The imaging lens system according to claim 1, wherein an image-side lens surface of the second lens is a concave surface.

12. The imaging lens system according to claim 1, wherein an object-side lens surface of the third lens is a convex surface.

13. The imaging lens system according to claim 1, wherein an image-side lens surface of the fourth lens is a convex surface.

14. The imaging lens system according to claim 1, wherein an image-side lens surface of the fifth lens is a concave surface.

15. The imaging lens system according to claim 1, wherein the first lens is a spherical lens.

16. The imaging lens system according to claim 15, wherein the second, third, fourth, and fifth lenses are aspherical lenses.

17. The imaging lens system according to claim 1, wherein the second, third, fourth, and fifth lenses are aspherical lenses.

18. The imaging lens system according to claim 1, wherein an image-side lens surface of the fifth lens has an inflection point and a concave curved part.

19. The imaging lens system according to claim 1, wherein the first lens has an Abbe number of less than 30.

* * * * *